2,799,607
WELDING FLUX FOR CAST IRON

Rene D. Wasserman, Stamford, Conn., assignor to Eutectic Welding Alloys Corporation, Flushing, N. Y., a corporation of New York No Drawing. Application September 26, 1955, Serial No. 536,740

3 Claims. (Cl. 148—26)

This invention relates to a flux for use in welding cast iron, and more particularly to a flux for use in welding cast iron by means of a gas welding process.

In welding cast iron by a gas heating process, such as the oxyacetylene process, the cast iron is subject to deterioration directly caused by the flame; and it is also subject to appreciable changes in its iron carbide structure as a result of the application of heat. Means must be provided for preventing these adverse effects.

Primarily the gas flame must be prevented from carburizing or oxiding the cast iron. A usual means of protecting the metal is a flux. A commonly used flux includes borax or sodium borate. This flux may also function to dissolve or slag-off undesirable metals or dirt on the surface of the metal to be welded. This dissolving or slagging-off is necessary in order to permit the liquid weld metal to wet the base metal.

Cast iron is particularly susceptible to alterations of its iron carbide structure resulting from the heat applied during welding. These transformations result in the formation of cementite ($Fe_3C$) which forms a network of extremely hard grains. These extremely hard areas are brittle, and also interfere with machining and fabricating. Once these hard areas are formed, only elaborate aftertreatment will minimize or eliminate their harmful effects. It is advisable, if possible, to prevent formation of the cementite. This may be accomplished by reducing the welding temperature and by preventing rapid cooling of the welded joint. These measures prevent the thermal shock phenomena which result in the extensive formation of unwanted cementite.

Factors which influence welding temperature are the melting temperature of flux, its fluidity and its wetting ability. The slagging-off characteristics of the flux are also very important in promoting effective joining of the weld metal at relatively low temperatures. Full slag coverage of the weld is also important in insulating the weld from the atmosphere to reduce the cooling or chilling rate which is of vast importance in influencing the carbide structure of the cast iron. After the weld has been fully cooled, however, the slag should be friable in order to reduce the labor cost in removing the slag before the cast iron is machined.

An object of this invention is to provide a flux for use in the process of welding cast iron which promotes a sound weld structure having a favorable metallurgical structure and whose slag is easily removed.

In accordance with this invention, a flux is provided including ingredients which promote the formation of a sound weld at low temperatures. This flux melts at low temperatures and is extremely fluid at a deposition temperatures to provide the superior wetting and cleaning action. During the cooling process the slag fully covers and insulates the weld. After cooling, a friable slag is formed which greatly facilitates in slag removal in preparation for machining or fabrication of the cast iron. These characteristics are imparted to a common potassium pentaborate, borax and boric acid flux composition by the addition of a minor amount of iron titanate.

A flux having the aforementioned highly desirable characteristics may be provided by compounding the following ingredients in the following formulation ranges. The indicated proportions are in percent by weight.

| Constitutent | Proportional Range |
|---|---|
| Potassium pentaborate | 40/50 |
| Borax | 20/30 |
| Boric Acid | 7.5/10.5 |
| Potassium Nitrate | 8./10 |
| Iron Powder | 2/6 |
| Iron Titanate | 4/6 |

A preferred example of a flux coatng, in accordance with this invention, is indicated in the following. The percentages are also given as percent by weight:

| Constitutent | Proportions |
|---|---|
| Potassium pentaborate | 45 |
| Borax | 25 |
| Boric Acid | 10 |
| Potassium Nitrate | 10 |
| Iron Powder | 5 |
| Iron Titanate | 5 |

The iron titanate may be provided in the form of ilmenite. All of the ingredients are finely powdered and mixed to form a homogeneous mixture in dry powdered form. This mixture may be directly used as a flux by dipping the electrode within the flux during the welding process. The flux adheres to the hot welding rod and thereby is applied effectively to the metals to be welded.

Other methods of applying the flux may be painting, spraying or extrusion on a core or filler rod commonly used to weld cast iron. These filler rods may be, for example, of cast iron or a cast iron alloy structure. The flux may also be molded upon these cores.

Iron titanate has a fairly high fusion point. This fusion point is higher than the melting points of the fluxes commonly known as low melting point fluxes. This novel flux, however, unexpectedly maintains its low melting point even though it includes higher melting point iron titanate. This novel flux also promotes the economic formation of sound welds in cast iron to surprising degree by facilitating low temperature welding with efficient deposition. These beneficial characteristics are a result of the effective slagging-off ability, the high fluidity, wetting ability, effective coverage slag and insulation during cooling, and transformation into a friable slag.

What is claimed is:

1. A flux composition for welding cast iron consisting essentially of a homogeneous mixture in dry powdered form of an alkali metal pentaborate-borax-boric acid flux composition with the minor addition of an amount of up to 6% by weight of iron titanate, and said amount being effective to impart high fluidity and wetting ability to the flux and to transform it into a friable slag without substantially raising the melting point of said alkali metal pentaborate-borax-boric acid flux composition.

2. A flux composition for welding cast iron consisting essentially of a homogeneous mixture including the following ingredients by weight:

Between 40–50% of potassium pentaborate
Between 20–30% of borax
Between 7.5–10.5% of boric acid
Between 8–10% of potassium nitrate
Between 2–6% of iron powder
Between 4–6% of iron titanate.

3. A flux composition for welding cast iron consisting essentially of by weight a homogeneous mixture of the following ingredients:

| | Percent |
|---|---|
| Potassium pentaborate | 45 |
| Borax | 25 |
| Boric acid | 10 |
| Potassium nitrate | 10 |
| Iron powder | 5 |
| Iron titanate | 5 |

References Cited in the file of this patent

UNITED STATES PATENTS

| 2,357,014 | Menahem | Aug. 29, 1944 |
| 2,479,798 | Wasserman | Aug. 23, 1949 |

FOREIGN PATENTS

| 479,376 | Great Britain | Feb. 4, 1938 |
| 663,327 | Great Britain | Dec. 19, 1951 |